US007178417B2

(12) United States Patent
Petersen et al.

(10) Patent No.: US 7,178,417 B2
(45) Date of Patent: Feb. 20, 2007

(54) PIEZO-ELECTRIC CONTENT USE MONITORING SYSTEM

(75) Inventors: Michael Petersen, Ottawa (CA); Allan Wilson, Ottawa (CA)

(73) Assignee: Intelligent Devices, Inc. (BB)

( * ) Notice: Subject to any disclaimer, the term of this patent is extended or adjusted under 35 U.S.C. 154(b) by 0 days.

(21) Appl. No.: 10/512,438

(22) PCT Filed: Apr. 23, 2003

(86) PCT No.: PCT/CA03/00584

§ 371 (c)(1),
(2), (4) Date: May 25, 2005

(87) PCT Pub. No.: WO03/090663

PCT Pub. Date: Nov. 6, 2003

(65) Prior Publication Data

US 2005/0223826 A1 Oct. 13, 2005

(30) Foreign Application Priority Data

Apr. 24, 2002 (CA) .................................... 2383180

(51) Int. Cl.
*G01M 19/00* (2006.01)

(52) U.S. Cl. ..................................................... 73/865.8

(58) Field of Classification Search ................ 73/865.8
See application file for complete search history.

(56) References Cited

U.S. PATENT DOCUMENTS

| | | | | |
|---|---|---|---|---|
| 4,419,016 | A * | 12/1983 | Zoltan | 368/10 |
| 5,412,372 | A * | 5/1995 | Parkhurst et al. | 340/568.1 |
| 6,574,166 | B2 * | 6/2003 | Niemiec | 368/10 |
| 2002/0104848 | A1 * | 8/2002 | Burrows et al. | 221/1 |
| 2003/0086338 | A1 * | 5/2003 | Sastry et al. | 368/10 |
| 2003/0099158 | A1 * | 5/2003 | De la Huerga | 368/10 |

FOREIGN PATENT DOCUMENTS

| | | | |
|---|---|---|---|
| DE | 195 28 856 | * | 2/1997 |

* cited by examiner

*Primary Examiner*—Robert Raevis
(74) *Attorney, Agent, or Firm*—Jones, Tullar & Cooper, PC

(57) ABSTRACT

A content use monitoring system is provided for monitoring use of blister packaged contents. The monitoring device comprises an integrated circuit (14), battery (16) and piezo-electric foil (18) or other transducer that can be attached to a existing blister package, in physical contact with their backing, via adhesive. When a content is expelled from a blister through the backing, the piezo-electric foil (18) or other transducer is deformed, generating an electrical signal. The integrated circuit (14) monitors the piezo-electric foil circuit for such signals, analyses them, and if they meet the programmed specifications, the time and other characteristics of the event are recorded in the integrated circuit's memory. The content use data can later be downloaded for analysis, education or clinical purposes via either a remote or contact reader.

19 Claims, 2 Drawing Sheets

PIEZO-ELECTRIC CONTENT USE MONITORING SYSTEM

CROSS-REFERENCE TO RELATED APPLICATIONS AND CLAIM TO PRIORITY

This application is the U.S. National Phase under 35 USC 371 of PCT/CA 03/00584, filed Apr. 23, 2003; published, in English, as WO 03/090663 on Nov. 6, 2003 and claiming priority to CA 2,383,180 filed Apr. 24, 2002, the entire disclosures of which are expressly incorporated herein by reference.

This invention relates to a content use and environmental exposure monitoring system for blister packaged items, and more particularly, to a device and a content use monitoring system that is suitably used for medication packaging and dispensing, but is not limited to medication packaging, and that does not rely on a system of electrical traces as described in the prior art.

BACKGROUND OF THE INVENTION

Blister packaging is widely used in the packaging industry. Within the health care field, blister packaging is the most rapidly growing method of packaging medication. A limiting factor to the effectiveness of many medications is patient compliance with the prescription. Medications usually must be taken at specific intervals based on their pharmacokinetics to maximize plasma levels, and deviation from the prescribed interval, or failure to take a dose, may result in ineffectiveness or adverse effects. Patient non-compliance with prescribed medication increases with the patient's age.

It is widely acknowledged that it would be useful to prescribing physicians and pharmacists to have a record of their patients' compliance with medication regimens. This information could then be used to educate patients. It could also prevent unnecessary and expensive changes in medication because of a lack of clinical response due to poor compliance.

In addition, there is increasing concern about the possibility of tampering with packaged pharmaceuticals.

There are also environmental factors that can decrease the effectiveness of some medications.

Inventions have been described to address the issue of patient compliance with blister-packaged medication. For example, Wilson and Petersen Canadian Patent Application No. 2353350 of Jul. 20, 2001 describes an invention designed to monitor the use of blister packaged medication. That invention relies on a system of electrically-conducting traces communicating with an Integrated Circuit (IC). Expelling the content from its blister breaks the trace, and the time and other characteristics of the event are recorded in the IC's memory. These data can later be retrieved and utilized.

Wilson and Petersen Canadian Patent Application No. 2366887 of Dec. 31, 2001 describes the application of a similar device to the lidstock prior to it being incorporated into a blister package via a form-fill-seal machine. This is a further refinement of the previous invention, but still relies on electrically-conducting traces passing in proximity to the blisters, the breaking of which trigger the recording of the events in the IC's memory for later retrieval.

The methods described in these patent applications involve systems of electrically-conducting traces located in such a way to be broken when the contents of each blister are expelled. One limitation of these methods is the complexity of arranging a system of traces, one for each blister, to arrive without crossing at the IC. Since there are many possible arrangements for the blisters on a blister package (different numbers and sizes of the contents), the prior art requires individualized design and tooling for each blister package configuration. Another disadvantage of the prior art is the difficulty of connecting the electrically-conducting traces to the pins of the IC. There is also the problem of ensuring that the traces are not broken by means other than expelling the contents, such as scratching or bending the blister package.

Given these limitations it is therefore desirable to provide a packaging device that is easy to use and capable of monitoring the use of package contents, and which does not require individual electrically-conducting traces for each blister to improve reliability and facilitate the manufacturing process. It is further desirable that such device be universally applicable or, at least, require a minimum of individualized design and tooling. It is also desirable that such device be compatible with blister packaging technology currently in widespread use.

SUMMARY OF THE INVENTION

The present invention use a digital IC with analog-to digital converter (ADC) and associated peripheral devices. These devices include but are not limited to piezo-electric films, or other piezo-electric transducers capable of detecting vibration profiles such as are generated by substrate breaking when contents are expelled from a blister package and generating an electrical signal. The present invention can be incorporated in a blister package during the production, or attached to an existing blister package, to monitor the use of the contents as well as environmental conditions to which the package is exposed.

The present invention comprises an IC communicating with a piezo-electric transducer, part of which is in contact with the backing (lidstock) of the blister package. When the contents of a blister are expelled through the backing, a characteristic vibration profile is created and the piezo-electric transducer converts this into an electrical signal. The resulting signal is carried to the analog input and ground pins of the IC. The signal is analysed, and if it meets the specified criteria, the time of the event, as determined by the IC's internal clock, is stored in the IC's memory.

The data may be stored in volatile or non-volatile memory depending on the desired use. The memory can be internal or external to the IC. The IC has the ability to communicate with external devices via radiofrequency (RF), infrared (IR) or direct contact, as desired. The data can thus be retrieved for storage or analysis at a later time, to be used for clinical, education, or research purposes.

The present invention is smaller than a blister package and can be attached to an existing blister package by an adhesive backing, or by mechanical or other means resulting in permanent contact between the invention's transducer and the lidstock of the package.

The present invention is self-contained, including its IC with ADC, memory, and clock; power source; external sensors' and communication port. The device can be integrated into the blister package during the production run, or attached to an existing blister package by adhesive at a later time, in a fashion designed to give permanent physical contact between the lidstock and the transducer. In the event of the use of piezo-electric foil, the foil sensor could have a tab that adheres to the backing foil of the package with adhesive.

The use of an ADC allows for the use of multiple sensors in addition to the piezoelectric sensor. These could include, but are not limited to, sensors to measure shock, temperature, radiation, humidity and pressure and light.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
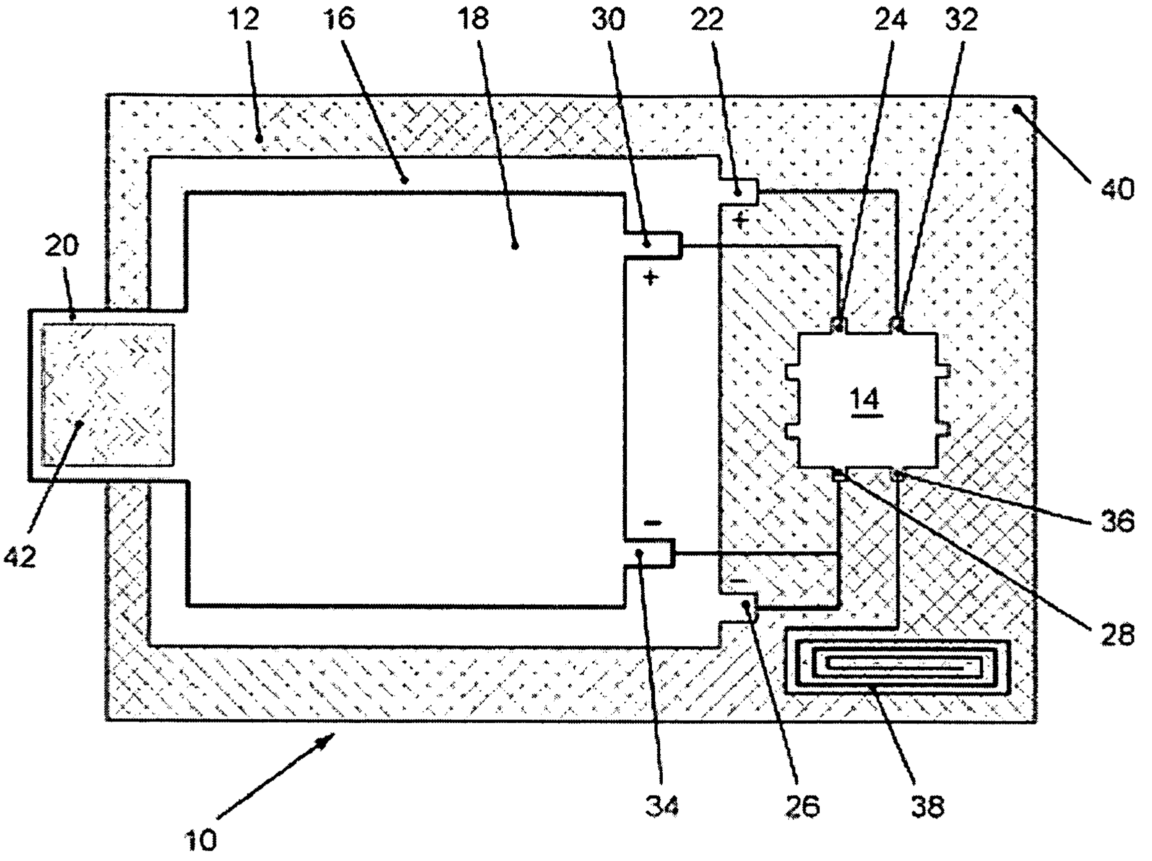
FIG. 1 is an enlarged schematic view of the device.

Referring to FIG. 1, an inventory monitoring device 10 in accordance with an embodiment of the present invention is described. The device comprises an inventory monitoring system that can be either integrated in a standard blister package during manufacturing, or, as depicted in FIG. 1, applied to an existing blister package.

The monitoring system comprises a non-conductive backing 12 having a coating of non-conductive adhesive, on which is mounted an IC 14 and a thin, flexible battery 16. The battery can equally be printed on the backing. FIG. 1 depicts an 8-pin IC 14 for illustrative purposes, but the device can utilize an IC with any number of pins. Mounted on the battery is a piezo-electric foil or film 18 with a tab extension 20, which extension is coated on its upper surface with a vibration-conducting adhesive.

In FIG. 1 the anode 22 of the battery 16 is connected to one analog input pin 32 of the IC 14 and the cathode 26 is connected to the ground pin 28. One terminal 30 of the piezo-electric film 18 is attached to an analog input pin 24 and the other terminal 34 is connected to the ground pin 28. Another IC pin 36 is connected to the antenna 38 for RF or IR communication. Four analog input terminals of the IC are available for other sensor inputs.

The invention is applied to a blister package in such a way that the tab extension 20 of the piezoelectric foil 18 is in physical contact with the backing of the blister package via the vibration-conducting adhesive. The device in its entirety may be attached to the blister package by its adhesive.

The piezo-electric foil 18, battery 16, and IC 14 can be arranged in any configuration to facilitate a specific application.

The IC 14 provides inventory control of the packaged contents. The IC is a small digital electronic device incorporating an ADC, clock, internal or external volatile or non-volatile memory, and several (8 in the schematic drawing) analog input pins. Such IC's are in widespread use. When a pill or capsule is expelled through the backing of the blister package, the resulting vibration profile is converted by the piezo-electric transducer into an electrical signal that is conducted to the analog input of the IC. The signal is analysed and if it meets the programmed criteria, the time of the event as determined from the IC's internal clock is stored in memory. Thus, the opening of the receptacle is detected and the use of the content is monitored.

For example, the IC may be programmed to record the time each content is removed from the package. It may also be programmed to record data collected by other sensors, including by not limited to, shock, temperature, radiation, humidity, pressure and light, which sensors are connected to the IC's other analog input pins.

The IC may also be programmed to generate warning signals or instructions to indicate when specified events of interest have occurred. The IC may be programmed with procedure data, regarding the use of the contents. For example, the procedure data might indicate the time when a capsule should be taken, when the package has been tampered with, or when specified environmental limits have been exceeded.

The warning generator compares the content use data with the procedure data, and generates warning data if the content use data indicates incorrect use of the contents in view of the procedure data, e.g., if the user has not accessed the product in the correct sequence, time and/or amount.

In response to the warning data, a warning device might present a warning to the user. The warning device may be any device which can present a warning to the user, such as light-emitting diodes (LED's), audible devices, liquid crystal displays (LCD's) or other types of displays, or any combination thereof. The warning may be a simple signal or message. It may be an alert or instructions of further procedures to use the packaging device.

Content expiry dates may also be programmed into the procedure data memory and expiration warnings may be provided by the warning device.

Reading the content use data stored in the use data memory may be accomplished by using a matched external reader (not shown). As an external reader, a contact type or non-contact communication type may be used.

For reading data by a contact type, the IC may also have an output port so that an external reader may be plugged into the output port and read the content use data.

In addition to or in place of the output port, a transmitter may be provided in the IC for transmitting the content use data to an external reader. The transmitter may be a wireless transmitter to communicate with a non-contact type reader, or a wired transmitter to communicate with a contact type reader. For short range communication between the IC and the reader, a low power wireless transmitter may be used. This type of transmission would include but not be limited to RF and IR. Long range wireless transmission may be used to permit realtime monitoring and communication at distance. This permits real time evaluation of inventory control and feedback to the user if desired.

The output port and transmitter may also be used for programming and reprogramming of the use data memory and/or procedure data memory.

As industry standards for IC's are in place for Smart Card applications, similar current or future standards may be followed in the IC of the packaging device to facilitate the use of standard read/write devices and to reduce costs for IC designs. However this invention is not limited to such standardized applications.

Depending on the intended use, the IC can be disposable or reusable. In simple applications, a low power IC with ADC, volatile memory and clock may be suitably used.

More complex applications may use higher power IC's such as bipolar, SiGe, or GaAs IC's. These IC's are listed only as examples and other types of IC's may also be used.

The device can be designed for single use (disposable) or multiple use.

The power cell can be standard or rechargeable.

Figure 2:
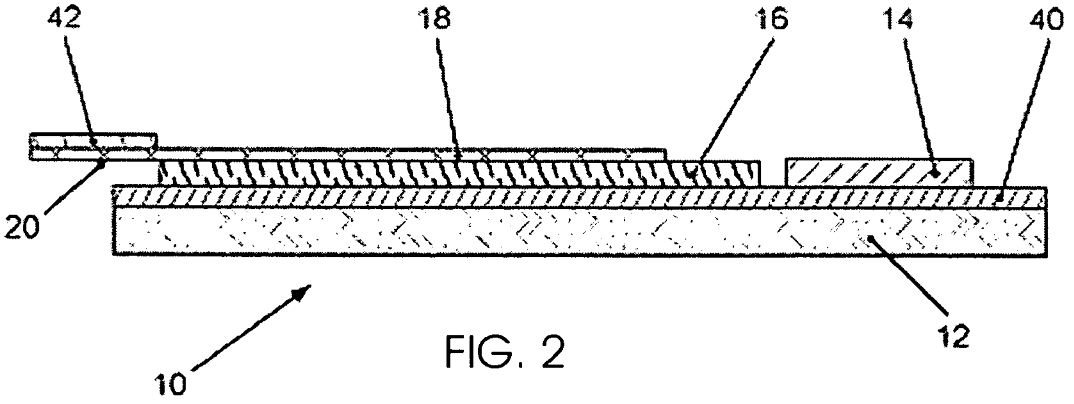
FIG. 2 is cross-sectional view of the device of FIG. 1.

FIG. 2 depicts the device in cross section. The backing 12 is non-conductive and of a size that can conveniently be applied to an existing blister package. The backing 12 has a layer of non-conducting adhesive 40. Attached to or printed on the backing is a thin, flexible batter 16. The battery's cathode and anode are connected to two pins of the IC as described previously. Attached to the surface of the battery 16 is a piezo-electric foil transducer 18 the terminals of which are also connected to the IC as described above. The piezo-electric foil comprises an extension or tab 20 the upper surface of which is coated with a vibration conducting adhesive 42.

in a variation of the device the piezo-electric foil may be replaced by another form of piezo-electric transducer capable of detecting vibration and generating electrical signals.

In use, the invention is applied to the cardboard backing of an existing blister package in such orientation that the tab 20 of the piezo-electric foil 18 comes into physical contact with some aspect of the backing of the blister package via the vibration conducting adhesive 42. The device is then in "permanent" contact with the package and the transducer with the package's backing.

When a pill, capsule or other content is expelled through the backing of the blister package, a characteristic vibration is created. This is detected by the piezo-electric foil and an electrical signal is generated. This signal is conducted to the IC where it is analysed by the IC's program. If the signal meets the programmed criteria, the time, and other characteristics if desired, of the event is recorded in the IC's memory.

When the blister package is returned to the dispenser, the data can be downloaded from the IC's memory using the antenna for RF or IR remote transmission, or by physical contact. The data can then be displayed, stored or analysed for clinical, educational or research purposes.

The device is not limited to use of an Spin IC.

The invention may also incorporate transducers for shock, temperature, radiation, humidity and pressure and light.

In a further variation of the invention, the device is integrated in the blister package during its production, using the same principles, which will be readily apparent to those skilled in the art from a review of the preceding detailed description of preferred embodiments in conjunction with the accompanying drawings.

Figure 3:
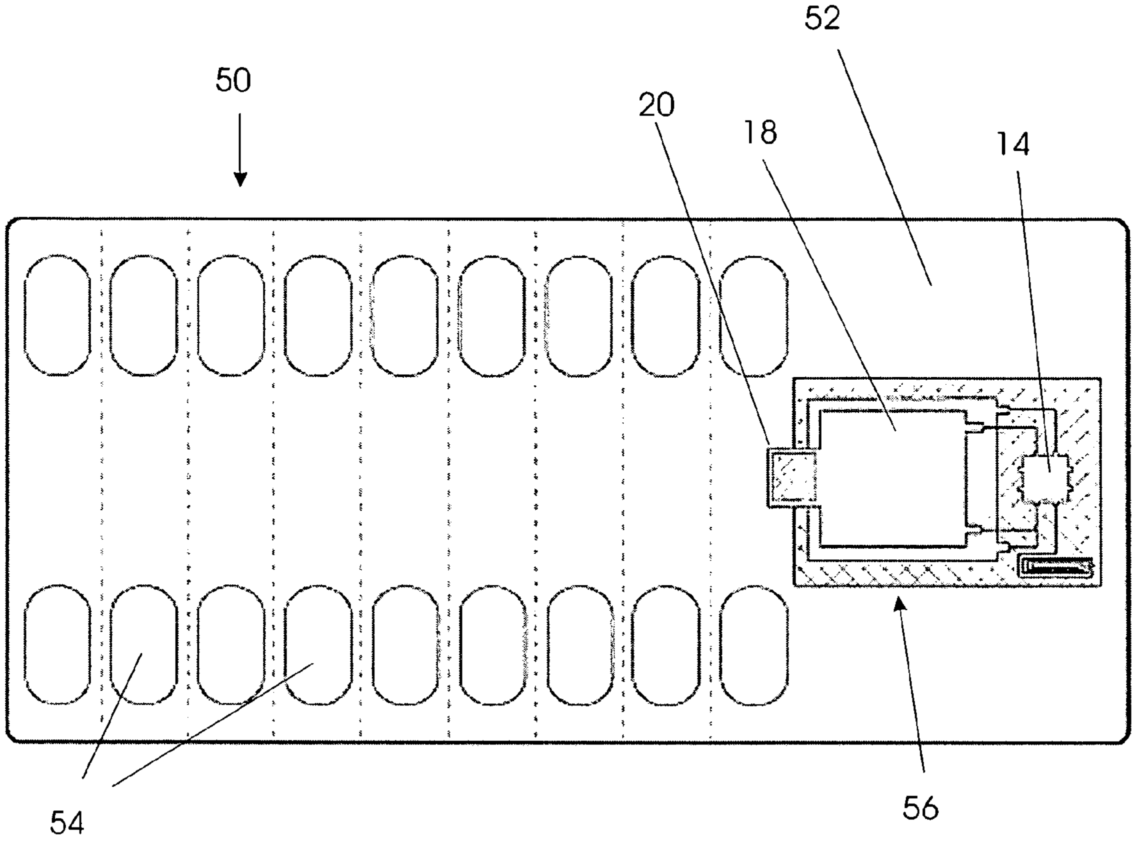
FIG. 3 is a view depicting a monitoring system of the present invention embedded with or part of a blister package.

FIG 3. illustrates the device of the present invention as integrated in a blister package. Here, the blister package 50 includes backing or lidstock 52 with receptacles 54, each of which can contain a pill, capsule, or other item (not shown). The blister package 50 as is well known in the art includes a foil or sealing material through which the contents of each receptacle will be expelled on use. Part of the package is a monitoring device 56 of the present invention, integrally formed on the lidstock, or embedded within the lidstock or the package, as part of the package during the manufacture thereof. As shown, the device 56 includes all of the elements of the device 10, such as the tab 20, the piezo-electric foil 18 and the integrated circuit 14. The operation is the same whether the monitoring device be attached to the blister package during the production thereof or following the production thereof.

The device may be used to determine if patients take their medication as prescribed.

The stored content use data may be used by the user or others. In some cases it may be necessary for the user to return the IC to the dispensary or physician to have their medication use recorded or examined for compliance before another medication package is released. Education may be targeted to poorly compliant patients. Some forms of medication abuse, e.g., taking it all at once to get intoxicated or trying to sell it on the street, may be detected. The IC may be recycled after its data is read, stored and erased.

The IC may also be connected to a wireless or fixed-wire transmitter or similar device to transmit the package content use data to a pharmacy or other facility in the cases where real-time information on content usage is desirable. Examples of such cases may include clinical drug trials where accurate data must be gathered, where a patient is prescribed potentially toxic pharmaceuticals, or where sequential courses of treatment are packaged and where it is imperative to ensure completion of one phase of treatment before starting the next. Compliance may then be monitored in real time, and warnings may be transmitted back to the patient by wireless if required.

The IC may also record details of batch-sensitive medications such as blood products where recalls might later be required, or to record any information about the use or non-use of the packaged product.

The package device may also permit clinical trials of pharmaceuticals such as analgesics where patients could take the medication as required for symptomatic relief and the time and amounts of medication would later be available to the researchers. This may free clinical trials from interval dosing, which in some cases may not be desirable or efficacious.

While the above example is described for packaging of pills, the invention is not limited to the packaging of pharmaceuticals or medical products. It is applicable to any items where blister packaging is feasible and where inventory control is desired.

As described above, since the packaging device uses a small IC, it may be made significantly smaller and simpler to use than those described in the prior art. It may be manufactured relatively cheaply as IC's become cheaper to produce. Also, it does not require bulky external connections or attachments for its operation. In its wireless version, no external attachment is required These features may contribute to increasing of user compliance.

While particular embodiments of the present invention have been shown and described, changes and modifications may be made to such embodiments without departing from the true scope of the invention.

The invention claimed is:

1. A device for monitoring use of blister packaged contents, said device comprising:

an integrated circuit having an internal clock and analog-to-digital conversion capabilities;

a memory associated with said integrated circuit;

a battery connected to said integrated circuit;

an antenna connected to said integrated circuit; and a piezo-electric transducer connected to said integrated circuit;

said device being adapted for attachment to a blister package such that vibration profiles created when contents are expelled from said blister package are detected by said piezo-electric transducer, which generates an electrical signal that is analysed for relevance to content use events by said integrated circuit, with the resulting use data being stored in said memory.

2. The content use monitoring device as claimed in claim 1, wherein the integrated circuit is programmed to monitor the transducer for such signals to detect the time of the signal; and the content use data includes the time of the expulsion event.

3. The content use monitoring device as claimed in claim 1, wherein the integrated circuit has an output port for outputting the content use data to an external reader.

4. The content use monitoring device as claimed in claim 1 further comprising a transmitter for transmitting the content use data to an external reader.

5. The content use monitoring device as claimed in claim 4, wherein the transmitter is a wireless transmitter capable of carrying out wireless communication with the external reader.

6. The content use monitoring device as claimed in claim 1, wherein the integrated circuit has a procedure data memory for storing a predetermined procedure data regarding how to use packaged contents.

7. The content use monitoring device as claimed in claim 6, for use with a blister package having multiple receptacles, and the predetermined procedure data includes the time, order and/or amount of opening of the receptacles.

8. The content use monitoring device as claimed in claim 6, wherein the integrated circuit includes a warning generator for generating a warning signal based on the content use data and the predetermined procedure data.

9. The content use monitoring device as claimed in claim 8 further comprising a warning device for providing a warning in response to the warning signal.

10. The content use monitoring device as claimed in claim 9, wherein the warning device is provided on the package.

11. The content use monitoring device as claimed in claim 9, wherein the warning device is provided in an external device, and the monitoring device further comprises a transmitter for transmitting the warning data to the external device.

12. The content use monitoring device as claimed in claim 6 further comprising a transmitter for sending the content use data to an external device and a receiver for receiving a warning signal from the external device; and a warning device, provided on the monitoring device, for providing a warning in response to the warning signal.

13. The content use monitoring device as claimed in claim 7, wherein the procedure data memory is a programmable memory for allowing a monitor to program the predetermined procedure data.

14. A content use monitoring system for monitoring use of contents in a package having at least one sealable receptacle for accommodating contents, the monitoring system comprising:

a piezo-electric transducer capable of creating an electrical signal in response to a detected vibration profile created when a receptacle is opened after being sealed; and an integrate circuit, embedded in the package, for monitoring the piezo-electric transducer for detecting and analysing electrical signals, and for generating content use data when such signals are detected.

15. The content use monitoring system as claimed in claim 14, wherein the integrated circuit has a use data memory for storing the content use data.

16. The content use monitoring device as claimed in claim 14 further comprising a receiver for receiving the content use data from the integrated circuit, and a transmitter for transmitting the content use data to an external reader.

17. The content use monitoring system as claimed in claim 16, wherein the transmitter is a wireless transmitter capable of carrying out wireless communication with the external reader.

18. The content use monitoring system as claimed in claim 14, wherein the integrated circuit has a procedure data memory for storing predetermined procedure data regarding how to use packaged contents.

19. The content use monitoring system as claimed in claim 18, wherein the integrated circuit has a warning device for presenting a warning based on the content use data and the predetermined procedure data.

* * * * *